(12) United States Patent
Campagna et al.

(10) Patent No.: US 12,095,909 B1
(45) Date of Patent: Sep. 17, 2024

(54) DATA INTEGRITY CHECKS FOR REENCRYPTIONS

(71) Applicant: Amazon Technologies, Inc., Seattle, WA (US)

(72) Inventors: Matthew J. Campagna, Bainbridge Island, WA (US); Jin Peng, Mercer Island, WA (US); Jason Wrang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 16/588,918

(22) Filed: Sep. 30, 2019

(51) Int. Cl.
*H04L 9/08* (2006.01)
*H04L 9/14* (2006.01)

(52) U.S. Cl.
CPC .......... *H04L 9/0866* (2013.01); *H04L 9/0825* (2013.01); *H04L 9/0869* (2013.01); *H04L 9/0891* (2013.01)

(58) Field of Classification Search
CPC ... H04L 9/0866; H04L 9/0869; H04L 9/0891; H04L 9/0825
See application file for complete search history.

(56) References Cited

U.S. PATENT DOCUMENTS

| | | | | |
|---|---|---|---|---|
| 6,049,612 A * | 4/2000 | Fielder | .................. | H04L 9/3236 380/44 |
| 9,405,920 B1 * | 8/2016 | Roth | .................. | G06F 21/602 |
| 9,882,720 B1 * | 1/2018 | Levy | .................. | H04L 63/123 |
| 10,148,430 B1 * | 12/2018 | Roth | .................. | H04L 9/0819 |
| 10,615,969 B1 * | 4/2020 | Griffin | .................. | H04L 9/0877 |
| 10,693,638 B1 * | 6/2020 | Cignetti | .................. | G06F 21/602 |
| 2002/0136411 A1 * | 9/2002 | Ishiguro | .................. | H04L 9/0891 380/278 |
| 2002/0150250 A1 * | 10/2002 | Kitaya | .................. | H04L 9/0822 380/277 |
| 2003/0188180 A1 * | 10/2003 | Overney | .................. | H04L 9/0869 713/193 |
| 2004/0243808 A1 * | 12/2004 | Ishiguro | .................. | G06F 21/10 713/176 |
| 2007/0206535 A1 * | 9/2007 | Sood | .................. | H04W 12/106 455/432.1 |
| 2007/0263875 A1 * | 11/2007 | Kitaya | .................. | H04L 9/0836 380/279 |
| 2012/0281838 A1 * | 11/2012 | Arnold | .................. | H04L 9/0822 380/277 |
| 2013/0034228 A1 * | 2/2013 | Arnold | .................. | H04L 9/08 380/44 |

(Continued)

OTHER PUBLICATIONS

NIST, "Implementation Guidance for FIPS PUB 140-1 and the Cryptographic Module Validation Program," Jan. 10, 2002, 63 pages.

(Continued)

*Primary Examiner* — Phy Anh T Vu
(74) *Attorney, Agent, or Firm* — Davis Wright Tremaine LLP

(57) ABSTRACT

A customer of a computing resource provider is associated with a key provided by a key management system. When the key is generated, a value is generated and encrypted with the key. In response to a detection of a trigger to re-encrypt the customer's key, the encrypted value is used to verify validity of the re-encrypted customer's key before committing it to storage and made available for use.

21 Claims, 8 Drawing Sheets

(56) References Cited

U.S. PATENT DOCUMENTS

| | | | |
|---|---|---|---|
| 2014/0237255 A1* | 8/2014 | Martin | G06F 21/64 |
| | | | 713/182 |
| 2015/0033037 A1* | 1/2015 | Lidman | G06F 21/78 |
| | | | 713/193 |
| 2015/0178515 A1* | 6/2015 | Cooley | H04L 63/083 |
| | | | 713/155 |
| 2016/0105283 A1* | 4/2016 | Mityagin | H04L 9/12 |
| | | | 380/279 |
| 2017/0006018 A1* | 1/2017 | Campagna | H04L 9/088 |
| 2018/0189193 A1* | 7/2018 | Bernat | H04L 9/088 |
| 2019/0044973 A1* | 2/2019 | Deutsch | H04L 63/1466 |
| 2019/0097794 A1* | 3/2019 | Nix | G06F 21/35 |
| 2019/0280860 A1* | 9/2019 | Peddada | H04L 9/3013 |
| 2021/0375409 A1* | 12/2021 | Romantsov | H04L 67/1097 |
| 2021/0377007 A1* | 12/2021 | Schiffman | G06F 21/608 |

OTHER PUBLICATIONS

NIST, "Implementation Guidance for FIPS PUB 140-2 and the Cryptographic Module Validation Program," Initial Release Mar. 28, 2003, 205 pages.

\* cited by examiner

DATA INTEGRITY CHECKS FOR REENCRYPTIONS

BACKGROUND

In modern computing systems and environments, security for systems and data is increasing in importance. While cryptographic operations have become ubiquitous in electronic communications, data storage, and other computing-related contexts, maintaining the integrity of data involved in the cryptographic operations is a challenge. For example, while computer hardware generally improves over time, a change of a single bit can drastically change the output of cryptographic operations. For example, a bit flip in a cryptographic key can cause the key to be unable to decrypt a ciphertext. Moreover, the nature of cryptographic material and ciphertext are such that changes to data used in cryptographic operations are very difficult to detect.

BRIEF DESCRIPTION OF THE DRAWINGS

Various techniques will be described with reference to the drawings, in which.

DETAILED DESCRIPTION

Figure 1:
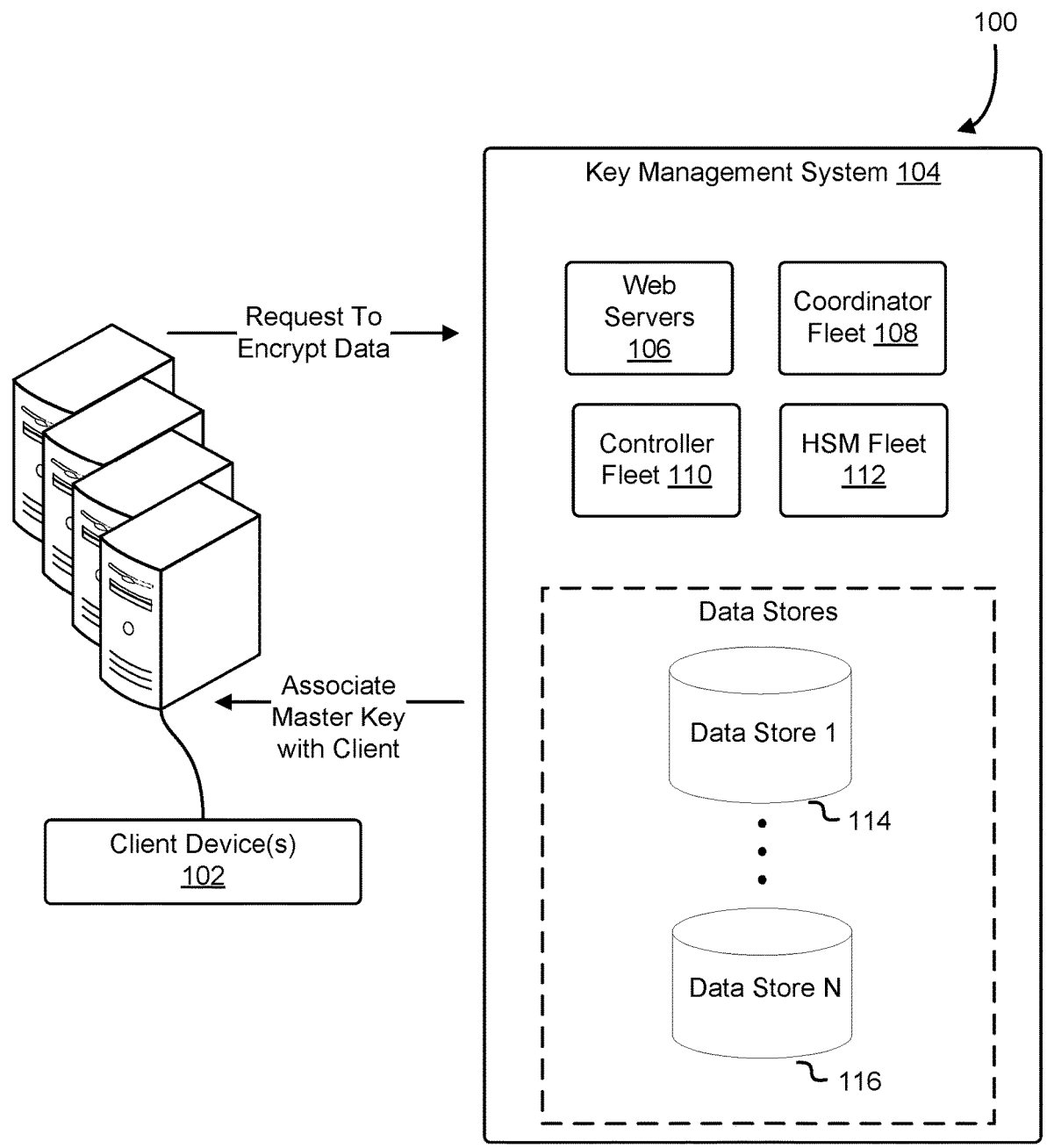
FIG. 1 illustrates an example environment between clients/client devices and a key management system, in accordance with at least one embodiment.

Techniques described and suggested herein include methods, systems and processes to ensure that a master key managed by a key management system for a customer of a computing resource service provider maintains its validity after the master key is re-wrapped (e.g., re-encrypted). Upon creation of a master key (e.g., customer master key), the key management system may also generate a random value and associate it with the master key. The key management system may encrypt, using an authenticated encryption method, the value using the master key to generate an encrypted value (e.g., ciphertext value). The key management system may further encrypt the master key with a domain key of the key management system to generate an encrypted key token (EKT). The EKT and its associated encrypted value may then durably stored in one or more data stores associated with the key management system.

In an embodiment, system policies associated with the key management system indicates that a key rotation and/or re-wrap (e.g., re-encrypt) is necessary to ensure that keys are protected in the key management system. In an effort to avoid having the re-encryption process output an invalid new EKT with an invalid re-encrypted master key, the key management system may enlist a set of hardware security modules (HSMs) to use the encrypted value associated with the EKT to ensure that the resulting new EKT is valid before committing the new EKT to storage and making it available for customer use.

In an embodiment, an HSM first decrypts the previously stored EKT to obtain a master key. Subsequently, the same HSM (or another HSM from a set of HSMs) may re-encrypt this master key under a new domain key to obtain a new EKT. The set of HSMs may then decrypt the new EKT to obtain a new master key. This new master key may then be used to decrypt the encrypted value. If the new master key fails to decrypt the encrypted value, an ERROR and HALT message may be generated and the new EKT may fail to be generated and thus, prevented from being stored in a data store. However, if the new master key is able to decrypt the encrypted value, then a new EKT may be created and deemed valid. Thus, the new EKT may be committed to one or more data stores and be made available for use on behalf of the customer. That is, in an embodiment, after this determination as to whether the new master key is able to decrypt the encrypted value, the key management system will then be able to determine whether to commit a new EKT to the one or more data stores. This way, by ensuring that every master key generated by the key management system is associated with an encrypted value, it allows the key management system to validate whether a re-encrypted key is valid for use prior to storing the re-encrypted key for storage and made available to a customer.

Techniques described and suggested herein provide many technical advantages to ensure the authenticity of re-encrypting a master key managed by a key management system for a customer before committing the re-encrypted master key to a data store and made available to the customer. Generally, whenever a key token or other object containing cryptographic material is used, transmitted, or stored, there is risk that an EKT may contain erroneous information and detection of erroneous information is challenging. Accordingly, techniques described herein allow for more accurate processing of requests to perform cryptographic operations and other effects, such as better detection of errors that can occur during the performance of cryptographic operations and the storage and transmission of cryptographic material.

The techniques described herein result in performing an assertion that a re-encryption of the master key in an EKT is still valid. A random value is generated along with the launch or creation of a master key for a customer such that it allows a key management system to use it to validate any new EKTs after performing a key re-wrap procedure. By generating a random value and encrypting it with the master key and specifically associating the encrypted value with the master key, the encrypted value may provide information or an indication as to whether a re-encryption of the master key is valid prior to storing the encrypted master key. This way, if a re-encrypted master key is compromised, the key management system can identify and perform mitigating actions before the customer attempts to call on the key management system to use it on behalf of the customer. As a result, this would also potentially avoid having to store an invalid master key for a customer and consequently, save storage space.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 between clients 102 and a key management system 104, in accordance with at least one embodiment. In an embodiment, a client device or a plurality of client devices 102 submits an application programming interface (API) request to encrypt data and/or applications running on the client devices 102. In an embodiment, an encryption key (or encryption keys) is generated and provided by a key management system 104 associated with the client devices 102. In some embodiments, the key management system 104 is referred to as a key management service or key manager. The key management system 104 is a system or service that is provided to a customer where the key management system 104 is configured to generate, exchange, store, use, destruct, and/or replace encryption keys on behalf of the customer such that cryptographic operations may be performed using the encryption keys. In response to the API request from a customer of one the client device 102 to encrypt data and/or applications, the key management system 104 may generate an encryption key specifically for the customer. The encryption key may be referred to as the master key or the customer master key. This may be performed by using a CreateKey API. In some instances, the API call has a different name such as GenerateDataEncryptionKey or KeysCreate API. In some instances, parameters for the API includes parameters such as a flag to indicate whether to bypass the key policy lockout safety check, customer key store identifier, key shape (key encryption information), location of the key, keyring (the purpose of the encryption) a description of the customer master key, the cryptographic operations to use the customer master key, the source of the key material for the customer master key, a key policy to attach to the customer master key, one or more tags, etc. Metadata may be associated with the master key to include identifiers of the customer to indicate their association with the master key. In an embodiment, the master key managed by the key management system 104 for the customer is provided, when requested (e.g., in an API request with parameters indicating the selection of the key), to encrypt data and/or applications running on web servers 106.

The key management system 104 may store, manage, and protect the master key on behalf of the customer using data stores 114, 116 (or data storage service). In some embodiments, data store 114 is the primary data store and data store 116 is the secondary data store. In an embodiment, a key management system 104 has the master key and the master key contains one or more hardware security module (HSM) backing keys (e.g., HBKs). These HBK keys, in an embodiment, are exported from the HSM in encrypted form, such as in EKTs, where keys to decrypt the encrypted master keys are available in plaintext form exclusively in one or more HSMs. In an embodiment, key management system 104 maintains multiple copies of these EKTs in separate, independent data stores 114, 116 that are highly durable. The key management system 104 does this to ensure that a key is highly available. That is, the original master key may be stored in primary data store 114 and a secondary master key (e.g., copy of the master key) may be stored in the secondary data store 116. The key management system 104 may store multiple master keys for a single customer. In some embodiments, the key management system 104 stores keys for multiple customers.

In an embodiment, a customer may submit a GenerateDataKey API call to the key management system 104 for a data key that is a plaintext copy of the data key and a copy that is encrypted under the master key that the customer specifies. The plaintext key may then be used to encrypt data outside of the key management system 104 and store the encrypted data key with the encrypted data. The request parameters for the GenerateDataKey API may include information such as encryption context (a set of key-value pairs that represent additional authenticated data), grant tokens (a list of grant tokens), specification for the key (length of the data key), number of bytes (length of the data key in bytes), key identifier, and the like. In response to the GenerateDataKey API call, the customer may obtain the encrypted copy of the data key, the identifier of the customer master key that encrypted the data key, and the plaintext data key. Moreover, in an embodiment, in response to the GenerateDataKey API, a random number encrypted under the data key is provided. When the customer invokes a re-wrap data key API (to re-wrap using a different customer key), the encrypted random number is provided to check the validity of the re-wrapped data key. In an embodiment, either the customer, the key management system 104, or both the customer and the key management system 104 uses the data key to verify validity of the re-wrapped data key since the customer and/or the key management system 104 have access to the data key (at least during a specific amount of time). If the validity check fails, corrective or mitigating actions may be taken, such as verifying validity again.

Additionally, key management system 104 schedules a rotation of the HSM domain keys on a daily basis, which invokes a mutation on key management system 104 to be re-encrypted under a new domain key. A domain key may be a secret that is accessible to multiple HSMs (e.g., stored within multiple HSMs), available in plaintext form exclusively within HSMs, and/or unexportable from HSMs, etc. In an embodiment, if a master key is encrypted under a domain key, any HSM with access to the domain key can decrypt the master key to use the master key to perform cryptographic operations.

In an embodiment, the master key is used to encrypt and decrypt data and/or applications running on web servers 106 associated with the customer. In some embodiments, web servers 106 (also depicted in FIG. 8) is hardware that is associated with the key management system 104 that manages the master key on behalf of the customer. In some embodiments, the master key is the same key used to encrypt and decrypt data (e.g., symmetric key); however, in other embodiments, the master key is a private key that is inaccessible outside of the key management system 104 and the public key (e.g., using asymmetric key scenario) is used to encrypt the data and/or applications and is available to the customer. That is, in an embodiment, the key management system 104 uses a public key of a public/private key pair of an asymmetric cryptographic algorithm to encrypt data and/or applications. The private key of the public/private key pair may be stored under high security conditions. For example, the private key may be stored in a physical safe of the key management system 104 that select individuals can open. In this manner, the data and/or applications are encrypted in a manner such that decryption of the data and/or applications requires at least access to the private key stored under high security conditions. Generally, techniques described herein with respect to symmetric cryptography are adaptable using asymmetric cryptography where private key components of public/private key pairs are maintained securely within HSMs (i.e., are available in plaintext form exclusively within the hardware of one or more HSMs).

In an embodiment, to adhere to standardized security practices, keep the master key safe and protected, the key management system may periodically rotate and/or re-wrap (e.g., re-encrypt) master keys. To prevent a re-encrypted master key from becoming invalid (e.g., by one or more bit flips caused by faulty hardware, environmental conditions (e.g., cosmic rays), or other reasons) during the re-encryption process, the key management system 104 may generate a random value to accompany a master key every time a master key is created for a customer. That is, in an embodiment, when a customer requests for data to be encrypted, the controller fleet 110 of the key management system 104 may send an API request to the HSM fleet 112 to generate a new random master key. Moreover, the controller fleet 110 may send another API request (e.g., GenerateRandom API with parameters in the request such as length of the byte string, and which customer key store to associate with) to an integer generator (not depicted in FIG. 1), for instance, to obtain a random value. In some instances, the API may be a RANDOMBYTES function, which calls on a secure random number generator. In some instances, the random value is generated in response to a single API request to create the random master key without having to send a separate API request. The single API request to create the random master key may include parameters to indicate that a random value also be created. The random value may then be encrypted with an authenticated encrypted method (AEM) by the newly generated master key such that a ciphertext value is generated. This newly generated master key may then be encrypted using a domain key of the key management system 104 to generate an EKT. Once the EKT is generated, it can be durably stored in a data store 114, 116 along with the encrypted value. In an embodiment, a mapping or mapping table may be included in data stores 114, 116. In some embodiments, the mapping or mapping table is stored in the primary data store 114. The mapping may indicate information such as the association and storage location of the EKT and the encrypted value. In some embodiments, the data stores 114, 116 are located within or outside of the set of HSM fleet 112. As described herein, a map may include a table, an algorithm, a set of operations, a deterministic function or other mechanism suitable receiving an input and determining a corresponding output. As shown in FIG. 1, there may be more than two data stores 114, 116. Although FIG. 1 depicts two data stores 114, 116, the key management system 104 may be associated with more than two data stores and copies of the EKT and its associated encrypted value may be stored in parts or all of the data stores. In another embodiment, the EKT may be stored in one data store and the encrypted value in a different data store.

Once the EKT and its associated encrypted value have been durably stored, a coordinator fleet 108 sends a triggering event (e.g., an API request) that indicates that an EKT in the key management system 104 needs to be rotated and/or re-wrapped (e.g., re-encrypted). The coordinate fleet 108 may be configured with a schedule according to key management system 104 policies to indicate when keys needs to rotated and/or re-encrypted. Other mechanisms to trigger rotation may also be used, such as use-based mechanisms that cause rotation after a certain number of cryptographic rotations and/or encryption of a certain amount of data and/or probabilistic mechanisms which stochastically trigger rotations may also be used. In an embodiment, when re-wrapping (e.g., re-encrypting) a master key, the coordinator fleet 110 submits an API call to a hardware security module (HSM) fleet 112 to re-encrypt the master key. A HSM fleet 112 may comprise of one or more HSMs. An HSM is a tamper-resistant hardware device that is used to strengthen encryption practices by generating and managing keys, encrypting and decrypting data, and creating and verifying digital signatures. Some HSMs are certified at various Federal Information Processing Standard (FIPS) 140-2 Levels and are frequently used to meet regulatory standards for cybersecurity and achieve greater security on customer data.

In response to the API call to re-encrypt the master key, the HSM fleet 112 performs a set of operations to ensure and authenticate the re-encrypted master key prior to storing the re-encrypted master key to a data store. With respect to FIG. 1, although a fleet of HSMs 112 is depicted, it does not imply full participation of every HSM in the fleet when performing the techniques described herein. Rather, the HSM fleet 112 may be load balanced and may have redundant cryptographic material so that when a HSM fleet 112 performs an operation, in an embodiment, an HSM from the fleet is selected from the fleet and the selected HSM is commanded to perform the operation. For instance, one of the HSMs from the HSM fleet 112 (which may comprises of one HSM or a plurality of HSMs) may first obtain an EKT and its associated encrypted value previously stored in data stores 114, 116. The HSM fleet 112 may then decrypt the previously stored EKT to obtain a master key. Thereafter, the fleet of HSMs 112 may re-encrypt this master key under a new domain key (since domain keys are refreshed/rotated periodically, and the domain key used here is more than likely different than the original domain key used to encrypted master key as described above) to obtain a new EKT. The new domain key and the previously used domain key are non-exportable or inaccessible from the fleet of HSMs 112. The fleet of HSMs 112 may then decrypt the new EKT to obtain a new master key. This new master key is then used to decrypt the encrypted value and as a result, an assertion may be made as to whether a new EKT is generated and deemed valid. If the assertion indicates that the new master key cannot decrypt the encrypted value then an ERROR and HALT message may be generated and a new EKT is not stored in a data store 116. That is, the key management system may determine invalidity as a result of a failure to decrypt the encrypted value. However, if the determination indicates that the new master key is able to decrypt the encrypted value, then a newly generated EKT is deemed valid, then the new EKT may be committed to data stores 114, 116 (or even more data stores for greater durability) and be made available for use by the key management system 104 on behalf of the customer. That is, in an embodiment, after this determination is complete, the key management system 104 will then store the new EKT to the data stores 114, 116. In an embodiment, once the new EKT is stored in data stores 114, the value is ephemeral in nature and thus deleted or otherwise removed from the key management system 104. In an embodiment, removing the value comprises zeroing or otherwise overwriting any memory locations in physical memory in which the value is stored, which allows the memory locations to be overwritten by another process over time, by removing power to random access memory (RAM), etc. In an embodiment, the encrypted value is not ephemeral in nature and instead provided to the customer where the customer may determine whether to durably store the value or delete the value.

The techniques described herein can also be extended to other cryptographic algorithms (including both symmetric and asymmetric algorithms). As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRU-Encrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 2:
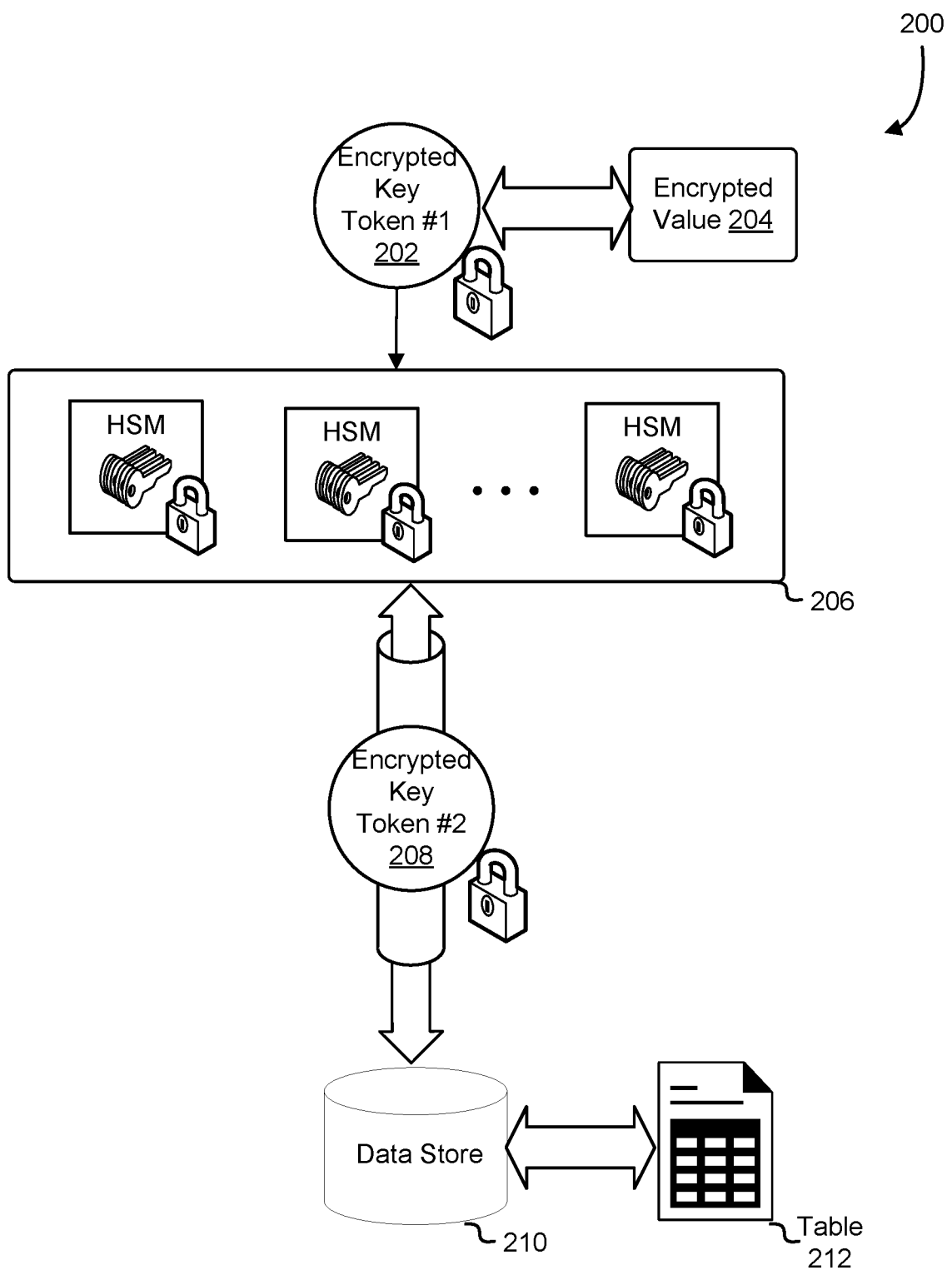
FIG. 2 illustrates an example process in which a set of hardware security modules preform validation, by using an encrypted value, on re-encryption of an encrypted key, in accordance with at least one embodiment.

FIG. 2 illustrates an example process 200 in which a set of hardware security modules (HSMs) 206 preform validation, by using an encrypted value, on re-encryption of an EKT 202, in accordance with at least one embodiment. In an embodiment, a set of HSMs 206 that are associated with the key management system 104 (as described in FIG. 1) are called upon to perform the authentication of a re-encrypted key before storing a new EKT. In an embodiment, a single HSM of the set of HSMs 206 performs all the steps to ensure that the new EKT is valid. In other embodiments, two or more HSMs of the set of HSMs 206 perform the steps to ensure authenticity of the new EKT. In some instances, the key management system identifies and submits an API request to indicate that an EKT 202 needs to be re-wrapped (e.g., re-encrypted). In an embodiment, the key management system then provides the EKT 202 and an associated encrypted value 204 (e.g., ciphertext value) to the set of HSMs 206. The set of HSMs 206 then may verify validity of a new EKT 208 by causing a set of HSMs 206 to decrypt the EKT 202 to obtain the master key and further use the master key obtained from decryption of the EKT 202 to decrypt the encrypted value 204. Once the master key is able to decrypt the encrypted value 204, then a second EKT 208 (which is a new EKT that includes a re-encrypted master key using a new domain key) may be stored as a result of verifying validity of the second EKT. In an embodiment, the second EKT 208 may be committed to a data store 210 or multiple data stores. The data store 210 may be the same data stores as depicted in FIG. 1 or a separate data store specifically for storing newly generated EKTs that have been authenticated. In an embodiment, the data store 210 includes a mapping 212 such that the second EKT 208 is associated with the same customer associated with EKT 202.

Figure 3:
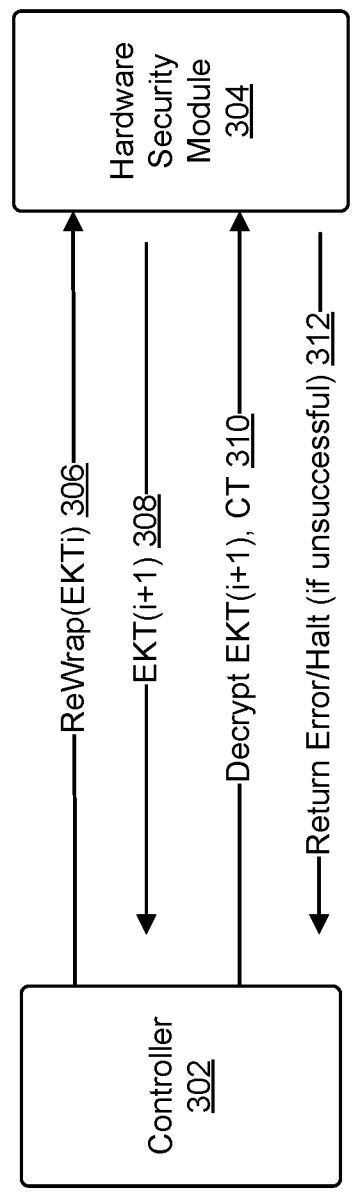
FIG. 3 illustrates an example process of re-encrypting an encrypted key using existing application programming interface (API) calls, in accordance with at least one embodiment.

FIG. 3 illustrates an example process 300 of re-encrypting an EKT using existing application programming interface (API) calls, in accordance with at least one embodiment. In an embodiment, the process to assert the authenticity of an new EKT with re-encrypted keys is performed by using existing APIs during re-wrapping (e.g., re-encrypting) of the keys outside the security boundary of a HSM 304. In an embodiment, a controller 302 communicates with a HSM 304 to perform the authenticity of re-encrypting EKTs. The controller 302 may be a part of the controller fleet 110 of the key management system 104 as discussed with respect to FIG. 1 above. For instance, code from the controller 302 may be as follows:

1) EKT(i+1)=ReWrap(EKTi)
2) PT=Decrypt(EKT(i+1), CT) on success store EKT(i+1), on failure return ERROR and HALT.

That is, in an embodiment, controller 302 issues the command ReWrap(EKTi) 306. In some instances, the command may simply be WRAP, WRAP_PUB_KEY, RSA_AES_WRAPPED_KEY (which defines the path of where the key will be stored), or the like. Parameters in these commands may include the target key information. This command indicates that an EKT is to be re-encrypted. The HSM 304 receives this command and in response, makes available or provides the EKT (e.g., EKT(i+1)) 308. Moreover, in an embodiment, the controller 302 issues another command to both decrypt the EKT and use the associated encrypted value (e.g., ciphertext value) for validation 310. The HSM 304 then determines whether re-wrapping the EKT and creating this new EKT has been successfully validated. If not, an ERROR and HALT message may be issued 312. In some embodiments, a key is wrapped by generating a temporary random Advanced Encryption Standard (AES) key (32 bytes long), wrap the temporary AES key with the wrapping public key, wrap the target key with the temporary AES key, zeroize the temporary AES key and then delete it, concatenate the two wrapped keys and write the output to a file.

Figure 4:
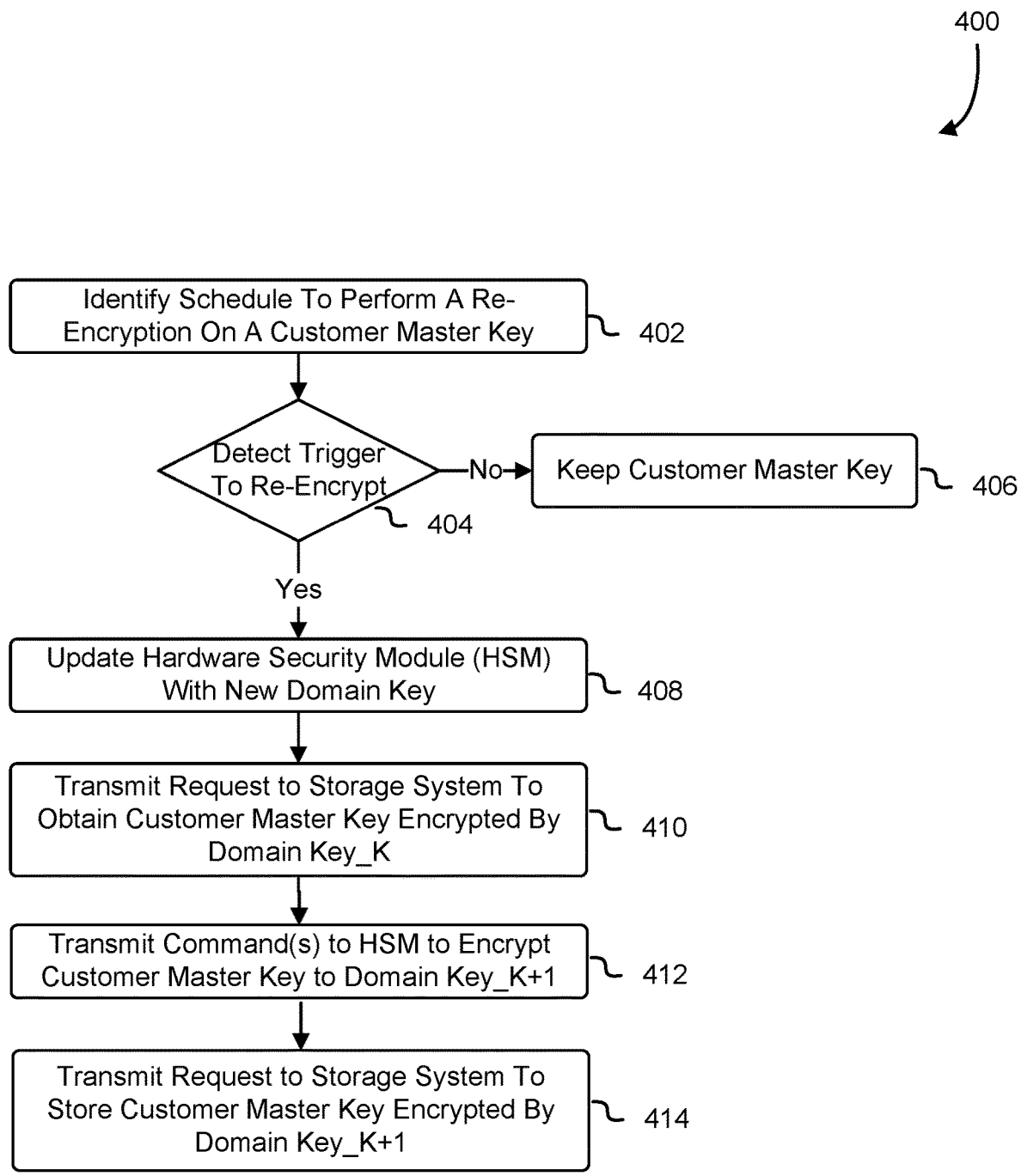
FIG. 4 illustrates an example process in which re-encryption of a customer master key can be implemented, in accordance with at least one embodiment.

FIG. 4 illustrates an example process 400 that uses at least one or more hardware security modules (HSMs) associated with a key management system in which re-encryption of an EKT that includes a customer master key can be implemented, in accordance with at least one embodiment. In an embodiment, a key rotation or key re-wrap (e.g., re-encrypt) schedule, based on system policies associated with a key management system, is identified 402. The schedule may indicate, for instance, when to re-encrypt a customer master key. The schedule may indicate that a customer master key be re-encrypted once a day, every three days, every five days, or the like. In an embodiment, once the schedule indicates that a re-encrypt on a specific customer master key needs to take place, the key management system then triggers the hardware security modules (HSMs) by submitting an API call (e.g., ReWrap API with request parameters including permissions to the keys, which keys to re-encrypt, etc) to perform both the re-encrypt and the authentication of the results of the re-encrypt. That is, upon detection of a trigger 404 (e.g., receiving an API call), a set of HSMs may be updated with a new domain key 408. In at least one embodiment, a request is transmitted to a storage system (e.g., data store) to obtain the customer master key that was previously encrypted by a domain key (e.g., Doman Key_K) of the HSM 410. In an embodiment, command(s) are then transmitted to the HSM to encrypt the customer master key using a current or new domain key (e.g., Domain Key_K+1) of the HSM 412. In an embodiment, a request is transmitted to the storage system (e.g., data stores) to store the customer master key that has been encrypted by Domain Key_K+1 414. This request is transmitted upon validation that the customer master key encrypted by Domain Key_K+1 is valid. The validation steps are described in more detail with respect to FIGS. 1-4. However, so long as the validation indicates that the customer master key encrypted by Domain Key_K+1 is authenticated then it may be stored in the storage system. If there is no trigger to re-encrypt a customer master key 406 then the customer master key stays the same and continues to be stored in the key management system.

Figure 5:
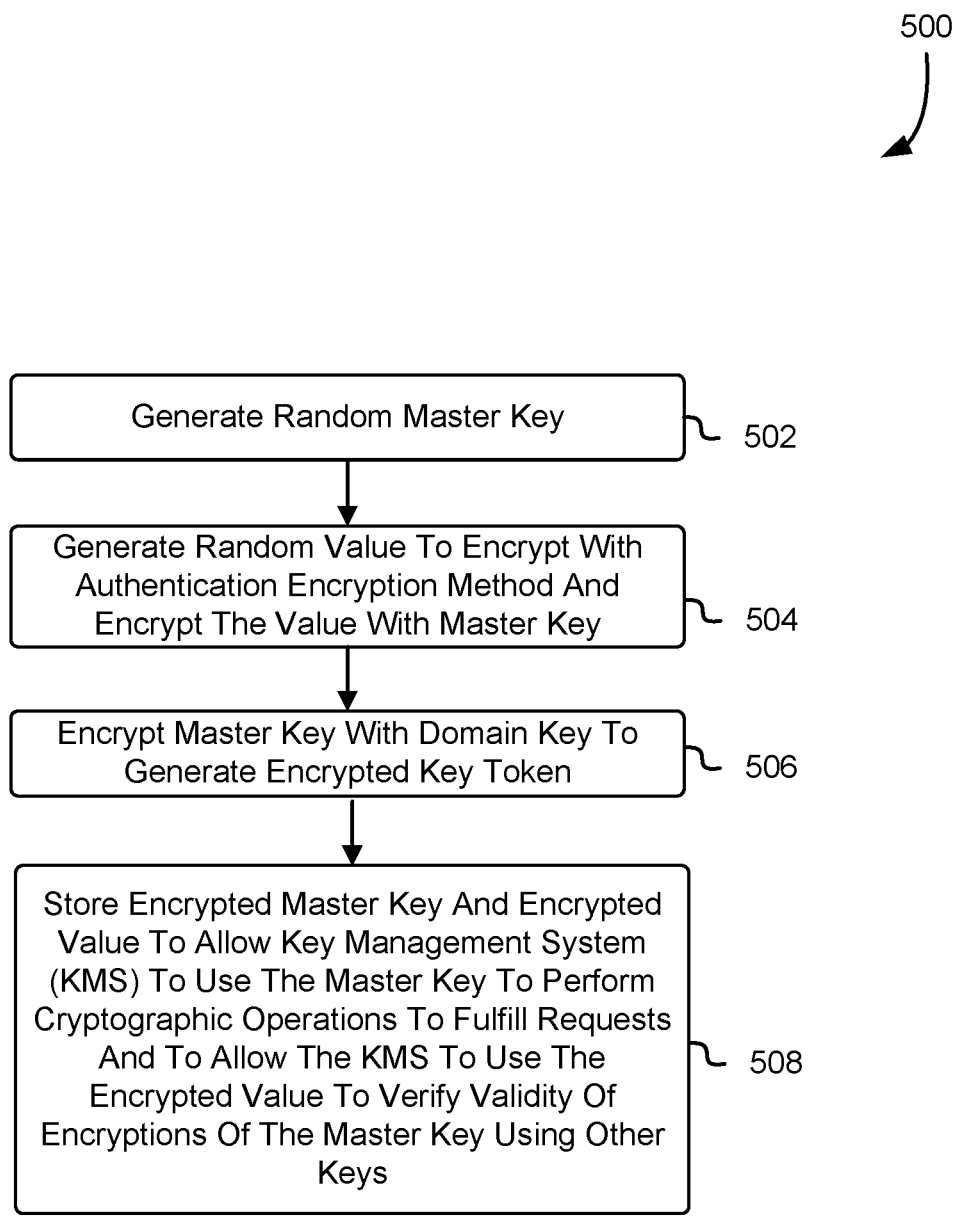
FIG. 5 illustrates a process for generating and storing an encrypted token and encrypted value, in accordance with at least one embodiment.

FIG. 5 illustrates a process 500 for generating and storing an encrypted token and encrypted value using one or more hardware security modules (HSMs) and one or more data stores associated with a key management system, in accordance with at least one embodiment. In an embodiment, when an API request submitted by the customer is received at a key management system, the key management system generates a random master key 502 for the customer. The key management system may subsequently send an API request to an integer generator or a HSM to create a random master key for the customer that is to be managed by the key management system. While the random master key is being created, the key management system may either synchronously or asynchronously submit an API call to generate a random value. The random value is generated specifically for the random master key. Using at least one of the HSMs, the random value may then be encrypted with an authenticated encryption method (AEM) by the random master key 504. For instance, an AEM is an Advanced Encryption Standard-Galois/Counter Mode (AES-GCM), Blowfish, Serpent, Twofish, and the like. In an embodiment, the master key then is encrypted by a domain key associated with the HSM to generate an EKT 506. The EKT and the encrypted random value may then be durably stored in one or more data stores associated with the key management system. That is, in an embodiment, the key management system stores the EKT (that includes the encrypted master key) and the encrypted value in at least one or more data stores to allow the key management system to use the master key to perform cryptographic operations to fulfill requests and to allow the key management system to use the encrypted value to verify validity of encryptions of the master key using one or more other keys 508. In an embodiment, the data stores storing the encrypted master key and the encrypted value includes a mapping or a table with information that indicates the storage locations and the association between the encrypted master key and then encrypted value. Moreover, the mapping may also include customer information and which of the master keys belong to which customer.

Figure 6:
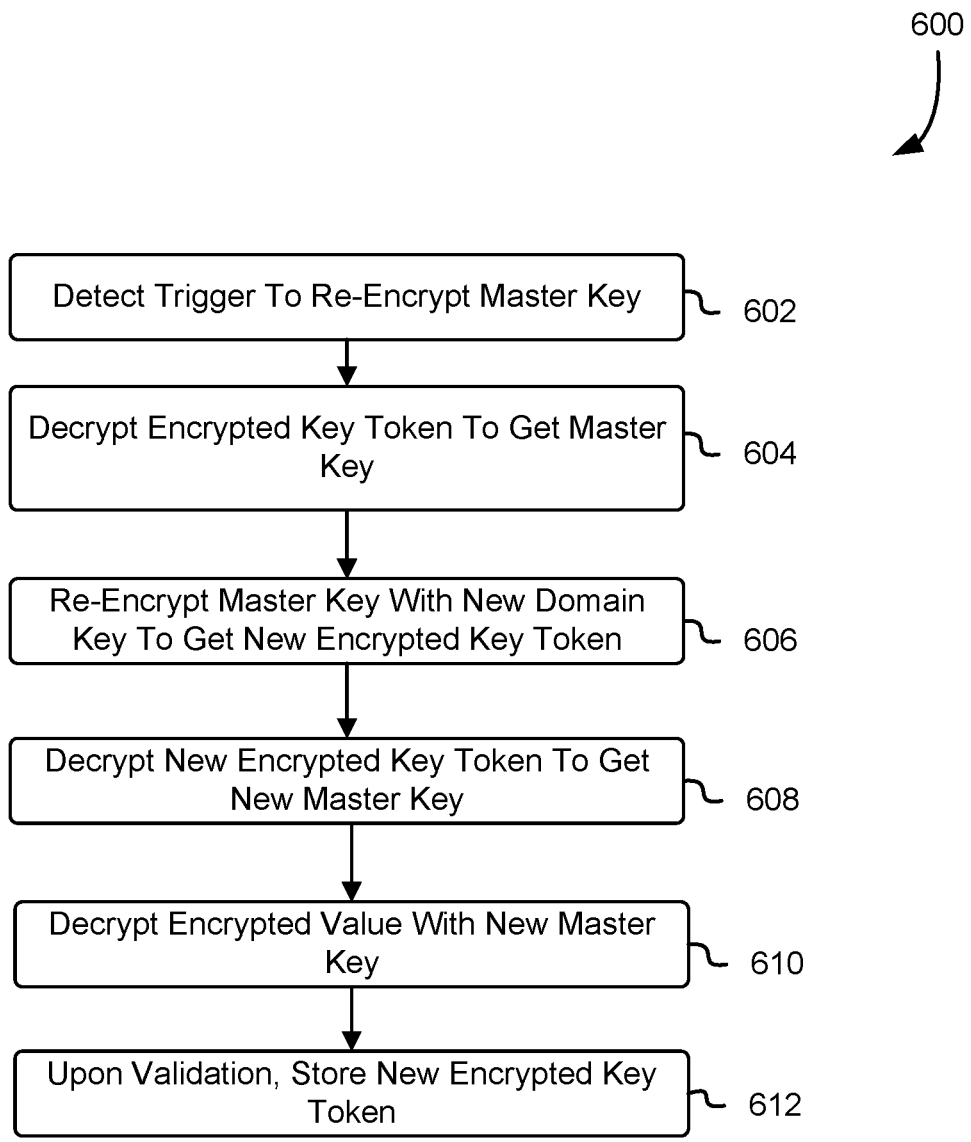
FIG. 6 illustrates a process to use an encrypted value to validate a re-encryption of an encryption key associated with a previously generated encrypted key token, in accordance with at least one embodiment.

FIG. 6 illustrates a process 600 where a key management system uses one or more hardware security modules (HSMs) to use a previously encrypted value to validate a re-encryption of an encryption key associated with a previously generated EKT, in accordance with at least one embodiment. Both the previously generated key token and the encrypted value may be obtained from one or more data stores associated with the key management system. In an embodiment, a trigger is detected, at a key management system, indicating that certain keys stored in the key management system needs to be rotated and/or re-wrapped (e.g., re-encrypted). The key management system may, according to key management system configurations, detect a trigger that a master key needs to be re-encrypted 602. In an embodiment, the key management system enlists, by submitting an API call, to a set of hardware security modules (HSMs) to perform authentication the re-encryption process. In an embodiment, the set of HSMs first obtains an EKT (that includes the encrypted master key) and an accompanying encrypted value. One of the HSMs from the set of HSMs may decrypt the EKT to obtain a master key 604.

Continuing with respect to FIG. 6, one of the HSMs from the set of HSMs may then re-encrypt this master key under a new domain key to obtain a new EKT 606. One of the HSMs from the set of HSMs may then decrypt the new EKT to obtain a new master key 608. This new master key is then used to decrypt the encrypted value 610 and as a result, a determination may be made as to whether a newly generated EKT is generated and deemed valid. If this the new master key fails to decrypt the encrypted value 610, an ERROR and HALT message may be generated and a new EKT is not stored in a data store. However, if the new master key successfully descripts the encrypted value, then a new EKT is generated and deemed valid. The new EKT may then be committed to one or more data stores and be made available for use by the customer 612 when the customer needs it to decrypt data and/or applications.

Figure 7:
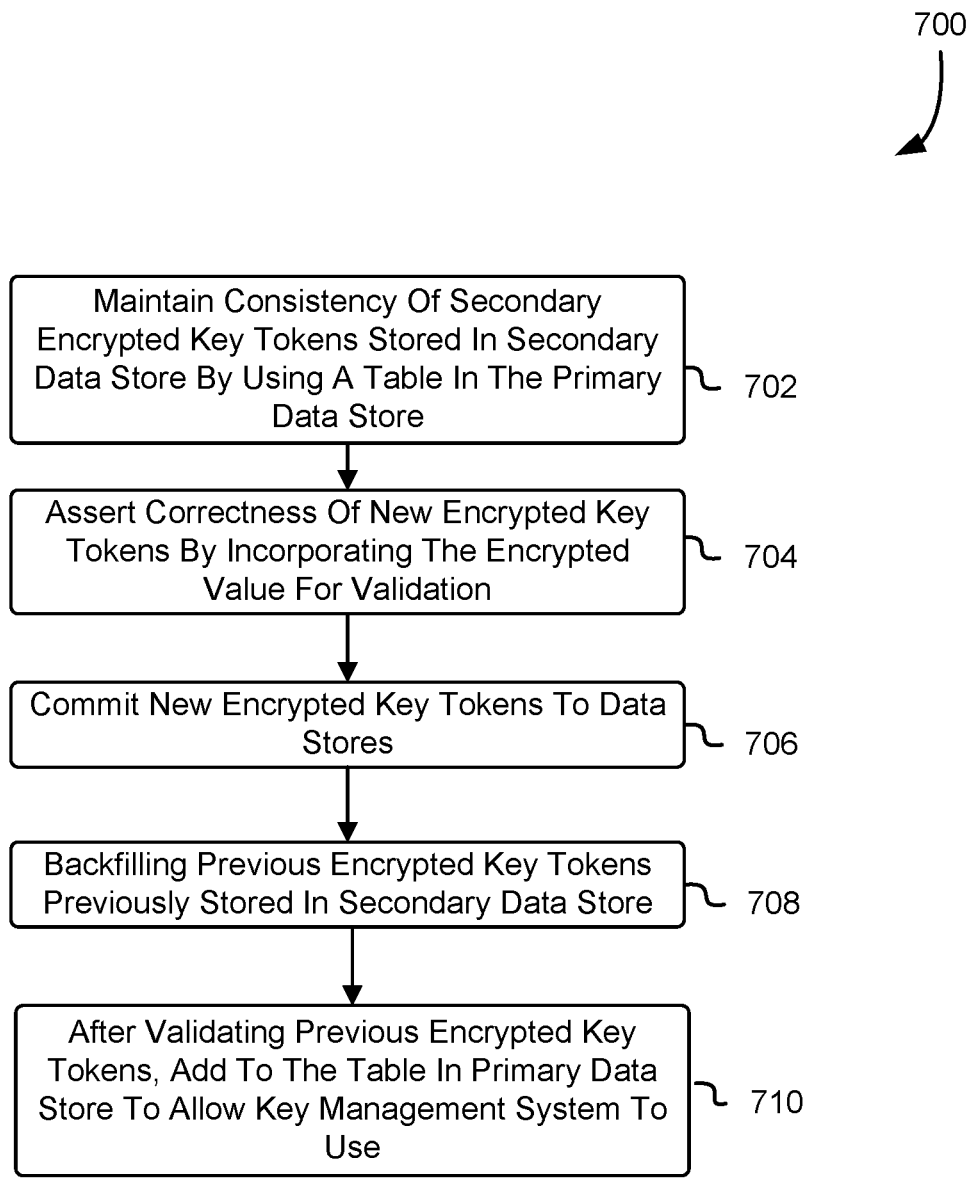
FIG. 7 illustrates a process to ensure encrypted key tokens are valid, in accordance with at least one embodiment.

FIG. 7 illustrates a process 700 using one or more hardware security modules (HSMs) associated with a key management system to ensure that EKTs are valid prior to storing EKTs in a data stores, in accordance with at least one embodiment. In an embodiment, to ensure that a new EKT is valid prior to storing the new EKT to a data store, the key management system performs a three phrase approach to assert the authenticity of the new EKT. In at least one embodiment, the first phase comprises maintaining consistency with new EKTs stored in secondary data stores 702. That is, the EKTs in a secondary data store are typically backup EKTs (e.g., copies of EKTs) in association with EKTs a primary data store. In other words, the backup EKTs in the secondary data store are a snapshot of an original EKT that was generated using a CreateKey API. However, the EKTs in the primary data store are mutated on a daily basis to be re-encrypted under the new domain key in a hardware security module. This poses a challenge in asserting the backup EKTs since the primary version may have changed within twenty-four hours. Because the lifecycle of the hardware security module domain key will have been archived off the hardware security module within seven days, it may be impossible to input it to an active hardware security module to validate the EKT as usable. Hence, in an effort to mitigate this, an additional table may be added in the primary data store that keeps a record of the original EKT generated in the CreateKey APIs. The intent of this table is to maintain the consistency of the original EKT among the primary and secondary data stores. This will enable the key durability process to validate the backup EKTs in the secondary data store are correct. In the event of a mismatch in the two records for the original EKT, operators via key management system may investigate and, if necessary, replace the corrupt copy from the data store that maintains the correct EKT.

In at least one embodiment, phase two of process 700 may comprise of asserting the correctness on new EKTs 704. That is, upon creation of a new EKT (e.g., create key or refresh key), the front-end will commit the EKT returned from the hardware security module to the data stores without any assertions on its usability. A corruption of the returned EKT will prevent the master key from being usable by the customer. In the event of a refreshed EKT, a corruption in the hardware security module would allow the key management system to use the master key on behalf of the customer with a bad key and go undetected until the customer was impacted. Thus, in an effort to mitigate this, the CreateKey and RefreshKey APIs may perform an assertion of the in-memory copies of the EKTs using the hardware security module. This assertion may validate and make it possible to generate usable customer ciphertext with the EKTs. After this assertion is complete, that the EKT is committed and stored in the data stores 706 and the CreateKey or Refresh-Key API can be completed. In an embodiment, RefreshKey API may include request parameters such as information indicating obtaining access to the keys and which key to refresh and.

In at least one embodiment, phase three of process 700 comprises backfilling previous EKTs 708. That is, in an embodiment, once the capability to maintain original EKT in the primary data store to validate consistency is generated, and the key management system is able to assert the authenticity of new EKTs going forward, it may be necessary to consider asserting the equivalence of older backup EKTs in the secondary data store and backfilling the original EKT into the primary data store. Similar to the previous phase, once the backup EKT is validated and is functionally equivalent to its primary EKT, the EKT may then be committed to the new table in the primary data store 710, which then allows key management system to consider this backup EKT as consistent.

In at least one embodiment, this process 700 is not automated because the backup EKTs will be wrapped with a domain key that has already been expired from the hardware security module fleet. Implementing this will require a new key ceremony procedure, in which the backup EKT and its associated domain token must be taken from the secondary data store, the current EKT from the primary data store, and input them into an offline hardware security module to perform validation. Performing a single EKT ceremony may take a significant amount of time. As such, some of the benefits of stemming from performing process 700 include: allowing the key management system to assert that all versions of the EKTs are functionally equivalent and also allowing the key management system to enforce that EKTs will be committed to a data store if they are usable and functionally equivalent to existing EKTs that are being replaced. In an embodiment, to assert that two EKT versions are functionally equivalent to each other, the following code may be performed:

//EKTs used for Encryption
    (pt, ct)=GenerateAndEncryptRandomBytes(EKT_1, randomAAD)
    pt==Decrypt(EKT_2, ct, randomAAD)
    //EKTs used for Signing
    pt=GenerateRandomBytes( )
    ct=Sign(EKT_1, pt)
    Verify(EKT_2, pt, ct)

In some embodiments, there are alternatives for asserting correctness on new EKTs. For instance, ciphertext may be maintained as metadata about the EKT in database. The database's schema may be updated to allow the encryption key token record to include generated ciphertext. This ciphertext may be populated on the CreateKey API, or a current EKT for backfilling. Thus, any mutation on the EKT may be validated with the pre-existing ciphertext. This ensures that every EKT version may decrypt the very first ciphertext. In another embodiment, another alternative is to generate ciphertext from EKT at runtime. When generating ciphertext in memory for each new EKT to validate the EKT to be usable. When the EKT is to be refreshed, generate the ciphertext with the existing EKT from the data store to be validated with the new EKT. This ensures that every new EKT is usable and validate two EKT versions are equivalent to each other.

Figure 8:
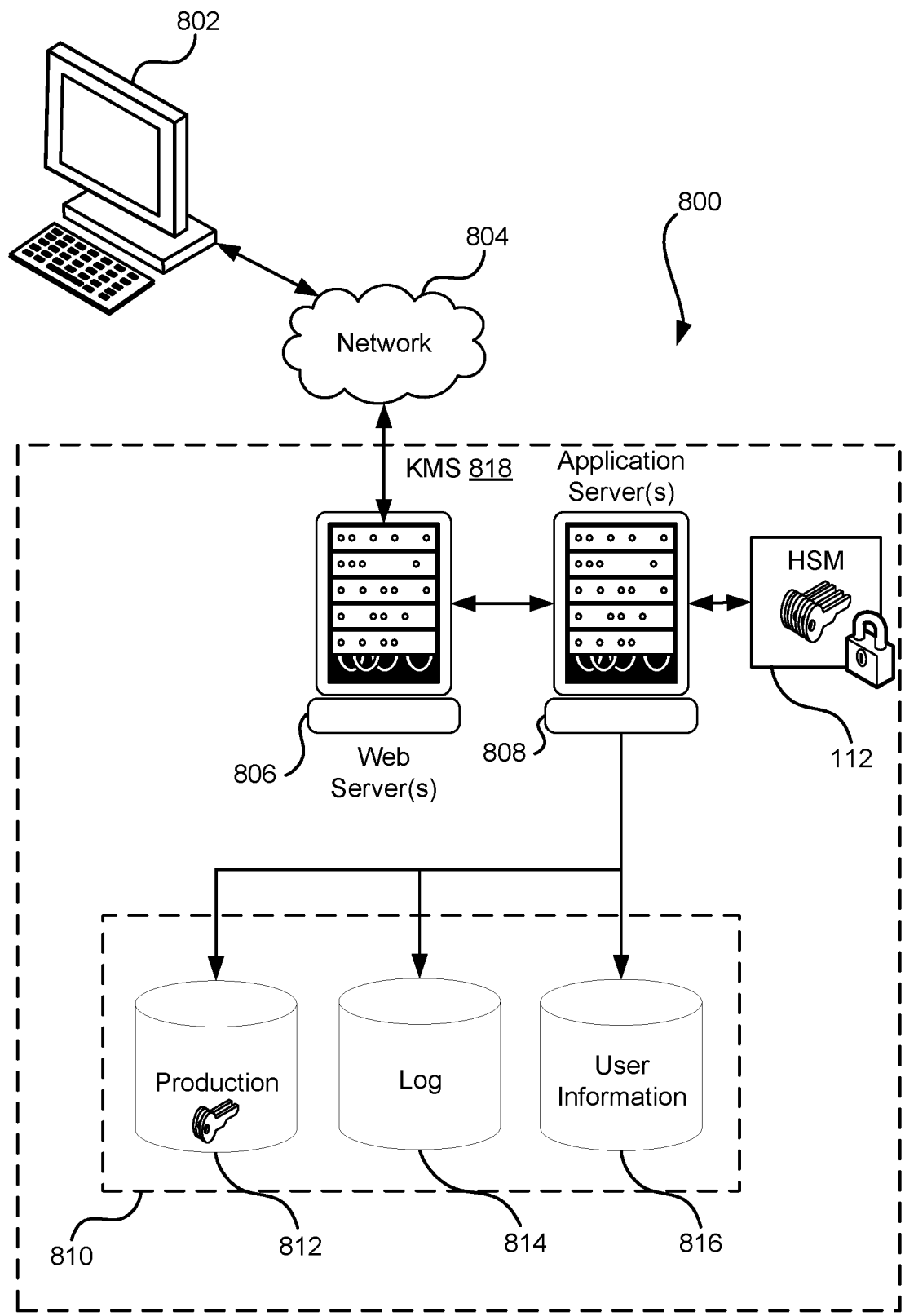
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art. In an embodiment, communication over the network includes transmitting messages to a key management system (KMS) 818 that includes servers such as web servers 806 and application servers 808. The application server may be associated with one or more hardware security modules (HSMs) 112 to store one or more encryption keys for a customer. The one or more encryption keys may be a part of one or more encryption key tokens that may be stored in at least one or more data stores 810 associated with the KMS 818. As described herein with respect to FIGS. 1-7, the KMS 818 can be a service that is provided to a customer who runs applications on the web server 806 such that the KMS 818 may perform cryptographic operations on behalf of the customer when needed.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store 810 may store the one or more encryption keys on behalf of customers which may be stored in 812. The data store 810 also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802.

Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising: detecting a trigger to re-encrypt a customer master key managed by a key management service on behalf of a customer of a computing resource service provider that operates the key management service; and as a result of detection of the trigger:

obtaining a first encrypted key token and a corresponding encrypted random value separate from the first encrypted key token, the first encrypted key token decryptable by a first domain key to obtain the customer master key and the encrypted random value decryptable by the customer master key to obtain the random value that is generated for the customer master key using a secure random number generator;

generating a second encrypted key token by causing a set of hardware security modules to re-encrypt the customer master key using a second domain key, wherein the second encrypted key token comprises a re-encrypted customer master key;

verifying validity of the second encrypted key token by causing the set of hardware security modules to:
decrypt the second encrypted key token comprising the re-encrypted customer master key to obtain the customer master key; and
use the customer master key obtained from decryption of the second encrypted key token to decrypt the encrypted random value; and storing the second encrypted key token comprising the re-encrypted customer master key as a result of verifying validity of the second encrypted key token.

2. The computer-implemented method of claim 1, wherein the encrypted random value is decryptable by an authenticated encryption method to obtain the customer master key.

3. The computer-implemented method of claim 1, wherein the first and second domain keys are inaccessible outside of the set of hardware security modules.

4. The computer-implemented method of claim 1, further comprising using a mapping table to determine an association between the second encrypted key token and the encrypted random value.

5. A system, comprising:
one or more processors; and
memory that stores computer-executable instructions that are executable by the
one or more processors to cause the system to:
obtain a first encrypted first key and an encrypted value, the first encrypted first key being decryptable by a second key to obtain the first key and the encrypted value is separate from the first encrypted first key and being decryptable by the first key to obtain the value, wherein the value for the first key is generated based at least in part on a random function;
generate a second encrypted first key by re-encrypting the first key; and
use the encrypted value to verify validity of the second encrypted first key, the second encrypted first key, when valid, being decryptable by a third key to obtain the first key.

6. The system of claim 5, wherein using the encrypted value to verify validity includes decrypting the second encrypted first key to obtain a copy of the first key, and further using the copy of the first key to decrypt the encrypted value.

7. The system of claim 6, wherein decrypting the second encrypted first key to obtain a copy of the first key is performed by a set of hardware security modules.

8. The system of claim 5, wherein the value is a random value.

9. The system of claim 8, wherein the random value is generated in response to an application programming interface (API) call to generate the first key and to be associated with the first key.

10. The system of claim 5, wherein the encrypted value is encrypted by an authenticated encryption method.

11. The system of claim 5, wherein the instructions, as a result of being executed by the one or more processors, further cause the system to determine invalidity of the second encrypted first key as a result of a failure to decrypt the encrypted value.

12. The system of claim 5, wherein the instructions, as a result of being executed by the one or more processors, further cause the system to:
respond to an application programming interface (API) call to generate the first
key by generating the first key and the value;
encrypt the value with the first key;
cause the first key to be encrypted by the second key; and store a mapping table
that indicates an association between the encrypted first key and the encrypted value.

13. A non-transitory computer-readable storage medium storing thereon executable instructions that, as a result of being executed by one or more processors of a computer system, cause the computer system to at least:
receive a request to create a first key to be managed by a key management system; and
to fulfill the request:
obtain the first key;
obtain a random value that is generated for the first key using an integer generator;
encrypt the random value with the first key to obtain an encrypted random value;
cause the first key to be encrypted by a second key to obtain an encrypted first key value, wherein the encrypted value is separate from the encrypted first key; and
store the encrypted first key and the encrypted random value to allow the key management system to use the first key to perform cryptographic operations to fulfill requests and to allow the key management system to use the encrypted random value to verify validity of re-encryptions of the first key based at least in part on decrypting the re-encryptions using other keys.

14. The non-transitory computer-readable storage medium of claim 13, wherein an application programming interface (API) request calls the integer generator.

15. The non-transitory computer-readable storage medium of claim 13, wherein the instructions further comprise instructions that, as a result of being executed by the one or more processors, cause the computer system to determine invalidity of at least one of the re-encryptions of the first key as a result of a failure to decrypt the encrypted random value.

16. The non-transitory computer-readable storage medium of claim 13, wherein the encrypted first key and encrypted random value are performed by a set of hardware security modules associated with the key management system.

17. The non-transitory computer-readable storage medium of claim 16, wherein the encrypted first key and the encrypted random value are stored in a data storage service outside of the set of hardware security modules.

18. The non-transitory computer-readable storage medium of claim 17, wherein the instructions further comprise instructions that, as a result of being executed by the one or more processors, cause the computer system to generate mapping information to associate the encrypted first key and the encrypted random value to indicate storage locations of the encrypted first key and the encrypted random value in the data storage service.

19. The non-transitory computer-readable storage medium of claim 13, wherein the instructions further comprise instructions that, as a result of being executed by the one or more processors, cause the computer system to obtain the first key in response to detection of a trigger to re-encrypt the first key.

20. The non-transitory computer-readable storage medium of claim 19, wherein the trigger is an application programming interface (API) call submitted by a controller to re-encrypt the first key.

21. The non-transitory computer-readable storage medium of claim 13, wherein the instructions further comprise instructions that, as a result of being executed by the one or more processors, cause the computer system to remove the encrypted random value after verifying validity of encryptions of the first key using other keys.

* * * * *